United States Patent
Reville et al.

(10) Patent No.: US 8,384,719 B2
(45) Date of Patent: Feb. 26, 2013

(54) AVATAR ITEMS AND ANIMATIONS

(75) Inventors: Brendan K. Reville, Seattle, WA (US); Stacey Law, Redmond, WA (US); Derek Smith, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 12/184,990

(22) Filed: Aug. 1, 2008

(65) Prior Publication Data

US 2010/0026698 A1    Feb. 4, 2010

(51) Int. Cl.
    *G06T 15/00* (2006.01)
(52) U.S. Cl. ............ 345/473; 345/474; 345/475; 463/7; 463/42; 709/204; 709/206; 715/706; 715/758
(58) Field of Classification Search .................. 345/473, 345/474, 475; 709/204, 206; 715/706, 758; 463/7, 42
See application file for complete search history.

(56) References Cited

U.S. PATENT DOCUMENTS

| | | | |
|---|---|---|---|
| 5,880,731 A | 3/1999 | Liles | |
| 6,227,974 B1 | 5/2001 | Eilat | |
| 6,229,533 B1 | 5/2001 | Farmer | |
| 6,268,872 B1 | 7/2001 | Matsuda et al. | |
| 6,385,642 B1 | 5/2002 | Chlan et al. | |
| 6,545,682 B1 * | 4/2003 | Ventrella et al. | 345/473 |
| 6,692,359 B1 | 2/2004 | Williams et al. | |
| 6,697,072 B2 | 2/2004 | Russell et al. | |
| 6,910,186 B2 * | 6/2005 | Kim | 715/706 |
| 7,006,098 B2 | 2/2006 | Bickmore et al. | |
| 7,275,987 B2 | 10/2007 | Shimakawa et al. | |
| 7,342,587 B2 * | 3/2008 | Danzig et al. | 345/473 |
| 7,425,169 B2 | 9/2008 | Ganz | |
| 7,568,004 B2 * | 7/2009 | Gottfried | 709/204 |
| 7,636,755 B2 * | 12/2009 | Blattner et al. | 709/206 |
| 7,690,997 B2 * | 4/2010 | Van Luchene et al. | 463/42 |
| 7,824,253 B2 * | 11/2010 | Thompson et al. | 463/7 |
| 7,840,903 B1 | 11/2010 | Amidon et al. | |
| 7,849,043 B2 * | 12/2010 | Woolf et al. | 706/48 |
| 7,913,176 B1 * | 3/2011 | Blattner et al. | 715/758 |

(Continued)

FOREIGN PATENT DOCUMENTS

KR  10-2008-0033781 A    4/2008
WO  WO 01/059709 A1    8/2001

(Continued)

OTHER PUBLICATIONS

Andre, E. et al., "Exploiting Models of Personality and Emotions to Control the Behavior of Animated Interactive Agents", Downloaded from Internet Dec. 19, 2008, http://www.dfki.de, 5 pages.

(Continued)

*Primary Examiner* — Phu Nguyen

(74) *Attorney, Agent, or Firm* — Woodcock Washburn LLP

(57) ABSTRACT

Mechanisms for accessorizing avatars with animated items. Avatars may be accessorized by items that have animations that are item specific, or they may be accessorized by items that apply to the entire body of the avatars. In addition, such item accessories may apply to avatars across different game titles and they may be added during the execution of a game, whether using a user interface or the game itself (e.g. receiving accessories for achieving certain milestones in a game). Such accessories may also be obtained from remote sources as packages, and then applied locally to avatars.

20 Claims, 10 Drawing Sheets

U.S. PATENT DOCUMENTS

| | | | |
|---|---|---|---|
| 8,047,915 | B2 | 11/2011 | Lyle et al. |
| 8,099,338 | B2 | 1/2012 | Betzler et al. |
| 8,187,067 | B2 | 5/2012 | Hamilton et al. |
| 2001/0019337 | A1 | 9/2001 | Kim |
| 2002/0067362 | A1 | 6/2002 | Nocera et al. |
| 2002/0068626 | A1 | 6/2002 | Takeda et al. |
| 2002/0151364 | A1 | 10/2002 | Suchocki |
| 2003/0228908 | A1 | 12/2003 | Caiafa et al. |
| 2004/0152512 | A1 | 8/2004 | Collodi et al. |
| 2004/0221224 | A1 | 11/2004 | Blattner |
| 2004/0250210 | A1 | 12/2004 | Huang et al. |
| 2005/0137015 | A1 | 6/2005 | Rogers et al. |
| 2005/0143174 | A1 | 6/2005 | Goldman et al. |
| 2005/0216558 | A1 | 9/2005 | Flesch et al. |
| 2005/0248574 | A1 | 11/2005 | Ashtekar et al. |
| 2006/0046820 | A1 | 3/2006 | Inamura |
| 2006/0121991 | A1 | 6/2006 | Borinik et al. |
| 2006/0143569 | A1 | 6/2006 | Kinsella et al. |
| 2006/0184355 | A1 | 8/2006 | Ballin et al. |
| 2006/0188144 | A1 | 8/2006 | Sasaki et al. |
| 2006/0293103 | A1 | 12/2006 | Mendelsohn |
| 2006/0294465 | A1 | 12/2006 | Ronen et al. |
| 2007/0002057 | A1 | 1/2007 | Danzig et al. |
| 2007/0074114 | A1 | 3/2007 | Adjali et al. |
| 2007/0110298 | A1 | 5/2007 | Graepel et al. |
| 2007/0111789 | A1 | 5/2007 | Van Deursen et al. |
| 2007/0113181 | A1 | 5/2007 | Blattner et al. |
| 2007/0167204 | A1 | 7/2007 | Lyle et al. |
| 2007/0168863 | A1 | 7/2007 | Blattner et al. |
| 2007/0178966 | A1 | 8/2007 | Pohlman et al. |
| 2007/0197296 | A1 | 8/2007 | Lee |
| 2007/0259713 | A1 | 11/2007 | Fiden et al. |
| 2007/0260984 | A1 | 11/2007 | Marks et al. |
| 2007/0273711 | A1 | 11/2007 | Maffei |
| 2007/0293319 | A1 | 12/2007 | Stamper et al. |
| 2007/0298866 | A1 | 12/2007 | Gaudiano et al. |
| 2008/0001951 | A1 | 1/2008 | Marks et al. |
| 2008/0045283 | A1 | 2/2008 | Stamper et al. |
| 2008/0059570 | A1 | 3/2008 | Bill |
| 2008/0076519 | A1 | 3/2008 | Chim |
| 2008/0081701 | A1 | 4/2008 | Shuster |
| 2008/0091692 | A1 | 4/2008 | Keith et al. |
| 2008/0120558 | A1 | 5/2008 | Nathan et al. |
| 2008/0158232 | A1 | 7/2008 | Shuster |
| 2008/0215974 | A1 | 9/2008 | Harrison et al. |
| 2008/0215975 | A1 | 9/2008 | Harrison et al. |
| 2008/0220876 | A1 | 9/2008 | Mehta et al. |
| 2008/0250315 | A1 | 10/2008 | Eronen et al. |
| 2008/0301556 | A1 | 12/2008 | Williams et al. |
| 2008/0303830 | A1 | 12/2008 | Fleury et al. |
| 2008/0309675 | A1 | 12/2008 | Fleury et al. |
| 2008/0309677 | A1 | 12/2008 | Fleury et al. |
| 2009/0063983 | A1 | 3/2009 | Amidon et al. |
| 2009/0069084 | A1 | 3/2009 | Reece et al. |
| 2009/0106671 | A1 | 4/2009 | Olson et al. |
| 2009/0198741 | A1 | 8/2009 | Cooper |
| 2009/0267960 | A1 | 10/2009 | Finn et al. |
| 2009/0312080 | A1 | 12/2009 | Hamilton et al. |
| 2010/0009747 | A1 | 1/2010 | Reville et al. |
| 2010/0023885 | A1 | 1/2010 | Reville et al. |
| 2010/0035692 | A1 | 2/2010 | Reville et al. |
| 2010/0203968 | A1 | 8/2010 | Gill et al. |
| 2010/0233667 | A1 | 9/2010 | Wilson et al. |

FOREIGN PATENT DOCUMENTS

| | | | |
|---|---|---|---|
| WO | WO 2004/053799 A1 | 6/2004 |
| WO | WO 2006/107182 A1 | 10/2006 |

OTHER PUBLICATIONS

Lisetti, C.L. et al., "MAUI: A Multimodal Affective User Interface", Multimedia, 2002, http://delivery.acm.org, 161-170.

Hayes-Roth, B. et al., "Improvisational Puppets, Actors, and Avatars", Computer Science Department, 2000, 10 pages.

Vilhjalmsson, H, H., "Autonomous Communicative Behaviors in Avatars", Submitted to the Program in Media Arts and Sciences, School of Architecture and Planning, MIT, Jun. 1997, 50 pages.

PCT Application No. PCT/US2009/050606: International Search Report and Written Opinion of the International Searching Authority, Feb. 25, 2010, 11 pages.

Kafai et al., "Your Second Selves: Avatar Designs and Identity Play in a Teen Virtual World," http://www.gseis.ucla.edu/faculty/kafai/paper/whyville_pdfs/DIGRA07_avatar.pdf, downloaded 2008, 1-9.

Vasalou et al., "Constructing My Online Self: Avatars that Increase Self-focused Attention," http://www.luminainteractive.com/research/downloads/note137-vasalou.pdf, downloaded 2008, 1-4.

Folea et al., "MPEG-4 SDK: From Specifications to Real Applications," http://www-artemis.int-evry.fr/Publications/library/Folea-WSEAS-ICC2005.pdf, downloaded 2008, 1-6.

Bacon, S., "Avatars," http://www.ymessengerblog.com/blog/category/avatars/feed, downloaded 2008, 1-7.

Fischer "Skript: An extendable language flexible avatar control framework for VR applications", Thesis 2005.

U.S. Appl. No. 12/189,067, Final Office Action dated Jul. 6, 2012, 12 pages.

U.S. Appl. No. 12/271,690, Final Office Action dated Jul. 16, 2012, 12 pages.

Lee et al., "Interactive Control of Avatars Animated with Human Motion Data," http://graphics.cs.cmu.edu/projects/Avatar/avatar.pdf, downloaded 2008, 10 pages.

Roeder, L., "Create a Personalized Yahoo Avatar," Personal Web About.com, http://personalweb.about.com/od/hacksforprofiles/ss/yahooavatar_5.htm, Jun. 6, 2008, 2 pages.

Alexa et al., "An Animation System for User Interface Agents," http://wscg.zcu.cz/wscg2001/Papers_2001/R342.pdf, downloaded 2008, 7 pages.

U.S. Appl. No. 12/271,690, Non-Final Office Action dated Feb. 16, 2012, 12 pages.

U.S. Appl. No. 12/189,067, Non-Final Office Action dated Aug. 19, 2011, 8 pages.

U.S. Appl. No. 12/178,535, Non-Final Office Action dated Aug. 31, 2011, 17 pages.

U.S. Appl. No. 12/178,535, Final Office Action dated Dec. 29, 2011, 14 pages.

Wikipedia Web printout: "Need for Speed: Underground", printed on Aug. 25, 2011.

"Changing Avatar Appearance with Material Scripting," http://update.multiverse.net/wiki/index.php/Changing_Avatar_Appearance_With_Material_Scripting, downloaded 2008, 1-10.

"How to Change Your Avatar's Appearance in Second Life," http://www.ehow.com/how_2036822_change-avatars-appearance.html, downloaded 2008, 1-2.

"The Adventure," http://got.communicatenewmedia.com/track2.php?t=features, downloaded 2008, 1-2.

\* cited by examiner

AVATAR ITEMS AND ANIMATIONS

CROSS-REFERENCE TO RELATED APPLICATIONS

The present application claims priority to U.S. Patent Application Ser. No. 61/080,626, filed on Jul. 14, 2008.

The present application may be related in subject matter to the following applications: U.S. patent application Ser. No. 12/178,535, U.S. patent application Ser. No. 12/188,953.

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2008 Microsoft Corp.

FIELD OF TECHNOLOGY

The presently disclosed subject matter relates to the field of computing, and more particularly, to fields such as gaming, although this is merely an exemplary and non-limiting field.

BACKGROUND

Avatars can be graphical images that represent real persons in virtual or game space. They can be embodiments or personifications of the persons themselves, or of principles, attitudes, or views of life held by such persons. Hitherto, avatars have been static, or at most, they have had limited animation capabilities. However, what is needed is systems, methods, and/or computer readable media that allow for creative animation based on input from users and/or games.

SUMMARY

Various mechanisms are provided herein for accessorizing avatars with animated items. Avatars may be accessorized by items that have animations that are item specific, or they may be accessorized by items that apply to the entire body of the avatars. In addition, such item accessories may apply to avatars across different game titles and they may be added during the execution of a game, whether using a user interface or the game itself (e.g. receiving accessories for achieving certain milestones in a game). Such accessories may also be obtained from remote sources as packages, and then applied locally to avatars.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included.

DETAILED DESCRIPTION

Figure 1:
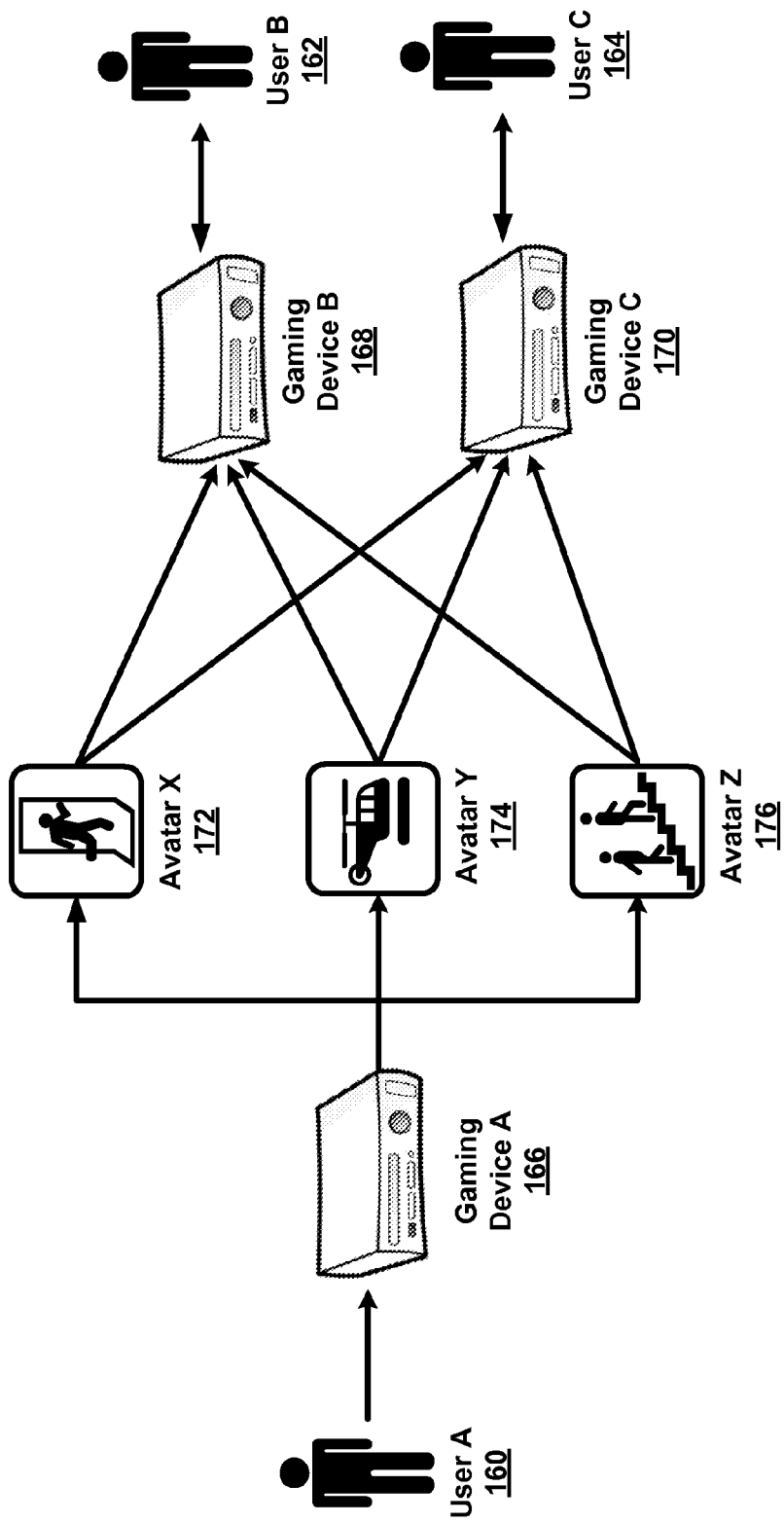
FIG. 1 illustrates that in the prior art avatars and any associated items were static.

FIG. 1 illustrates that in the prior art avatars and any associated items were static. A user A 160 could play a gaming console A 166, and in playing such a gaming console 166, the user 160 could have multiple avatars, such as avatar X 172, avatar Y 174, and avatar Z 176. These avatars 172, 174, 176 would typically be game specific. In other words, one game would allow the user 160 to select a first avatar 172, a second game would allow the user 160 to select a second avatar 174, a third game would allow the user 160 to select a third avatar 176, and so on.

In the case of online game playing, other users, such as user B 162 and user C 164 could interact with the first user 160 if such online game playing was mediated by a central server. In the prior art shown in FIG. 1, such avatars 172, 174, 176 that were associated with the first user 160 could be seen by the other users 162, 164, however, these avatars 172, 174, 176 would be static in that they would not change over time or at least they would not be animated—as this term is understood by those of skill in the art.

Figure 2:
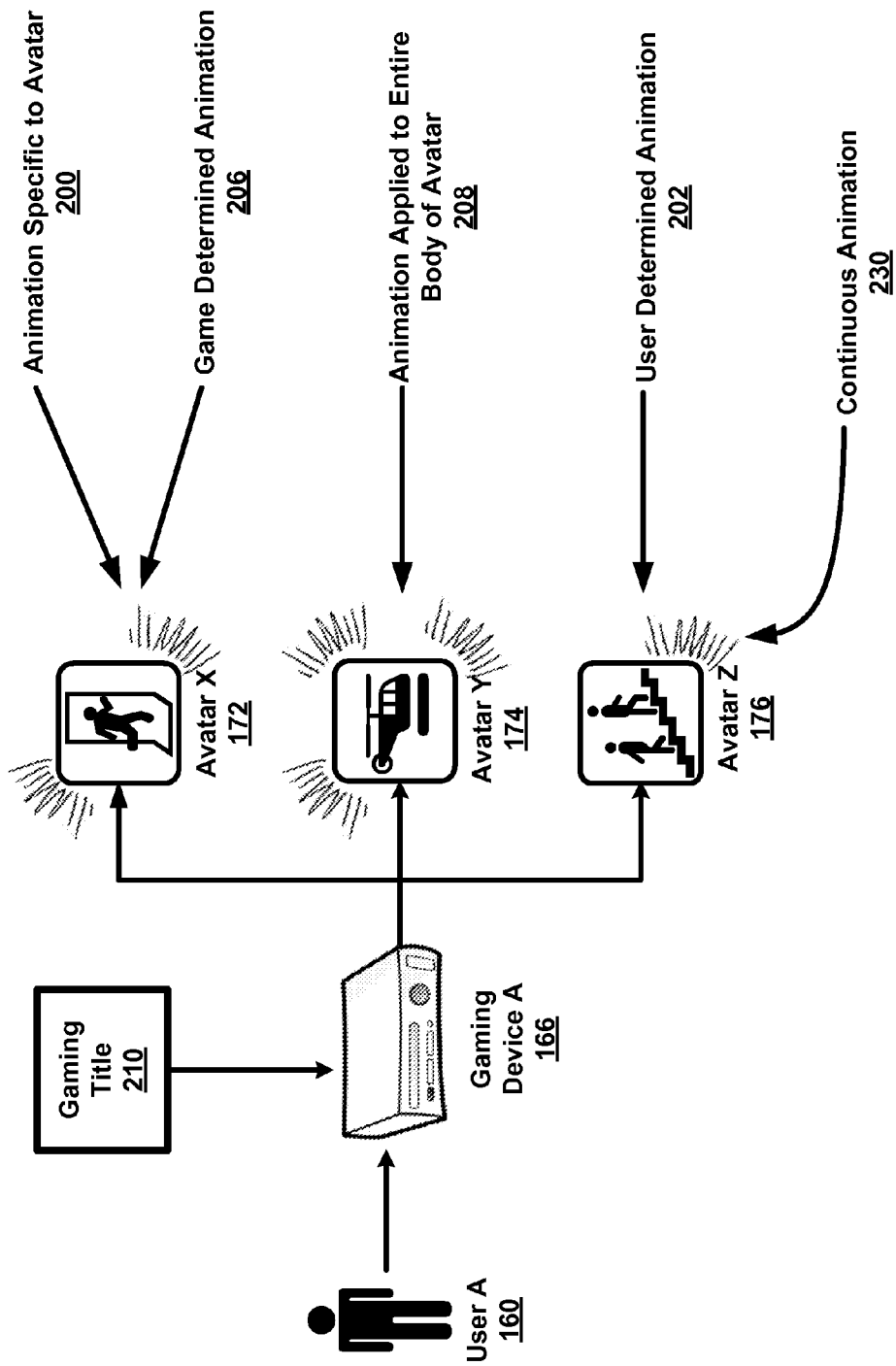
FIG. 2 illustrates that in contrast to FIG. 1, avatar items can be animated in a plurality of ways.

In stark contrast to FIG. 1, FIG. 2 illustrates that avatars can be animated in a plurality of ways. Specifically, avatars may be adorned or accessorized by "items," where an item is understood to be any piece of graphic and/or audio component that may be applied to an existing avatar. By way of example and not limitation, items may include hats, shoes, gloves (i.e., any piece of clothing), in which case such items may contain animations that are item specific—for example, a hat that keeps changing colors or moves about an avatar's head. Moreover, items may also apply to the entire avatar body—for example, the notion of dancing, smiling, or jumping may be applied to an avatar as a whole in order to add to the avatar's liveliness and presentability (or it may be added for other purposes).

In any event, FIG. 2 shows that in one aspect of the presently disclosed subject matter, avatar X 172 may have applied to it animation that is specific 200 to the avatar 174 (e.g. the hat example discussed above). On the other hand, avatar Y 174 may have animation that is applied to the entire body 208 of the avatar 174 (e.g. the dance example discussed above). In either case 172, 174, or in other cases 176, the avatars may be user determined 202 or they may be game determined 206. This means that users may accessorize the avatars 172, 174, 176 via some interface, or such avatars may be accessorized by gaming titles 210. In this latter scenario, if the user 160 is playing a game and unlocks an achievement in the game, the reward for such achievement may be animation items that then may be applied to the user's 160 avatars—whether to the avatars in a specific game or to the avatars in general for several (or all) games.

For example, if a user wins a hat animation, such a hat animation may be applied to the avatar across several games, whether racing games, strategic games, fantasy games, and so on. The animation may be the same for an avatar across several games, or it may change depending on the context of the game. Such details are implementation specific, and all aspects of such animation items are contemplated herein.

Figure 3:
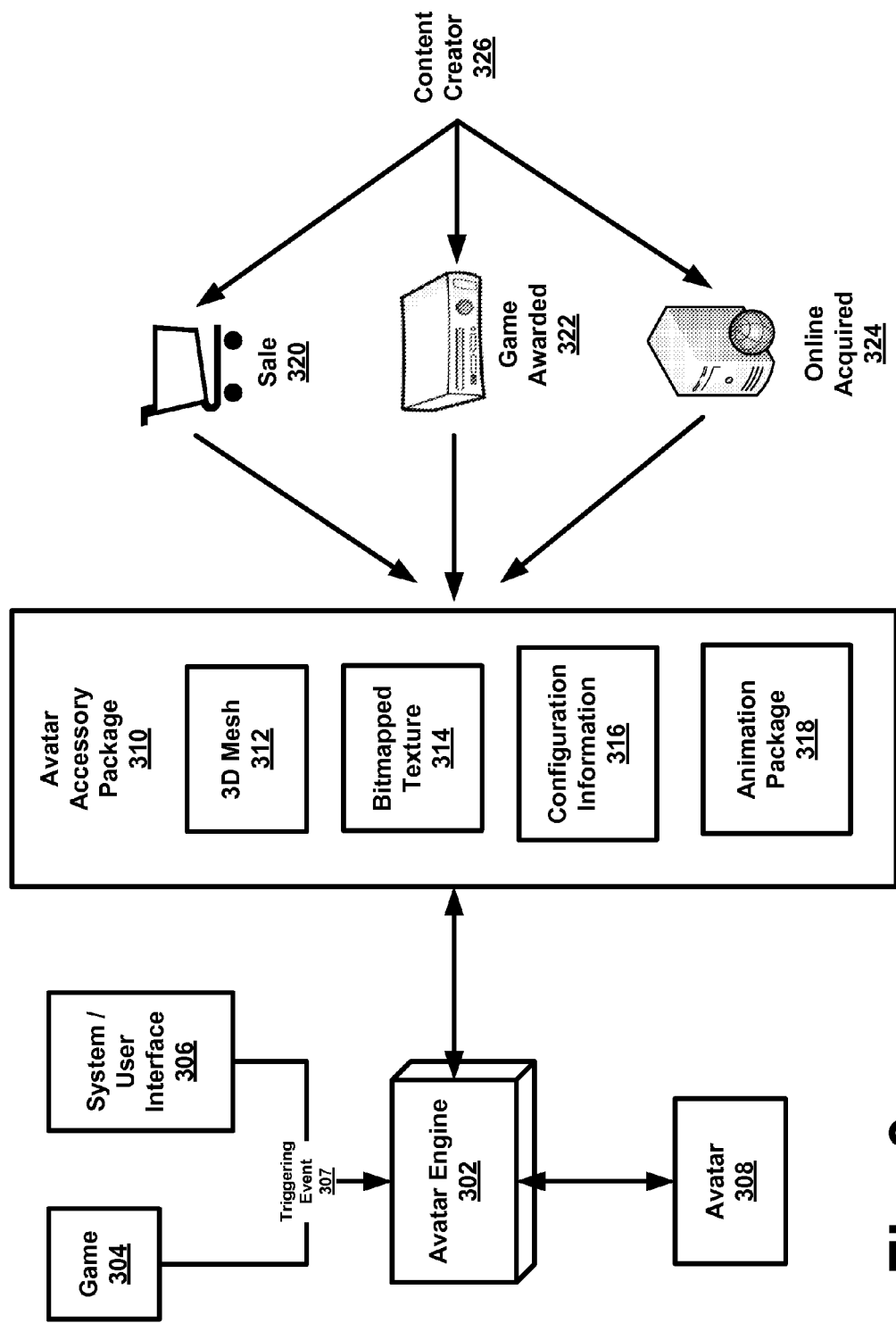
FIG. 3 illustrates an exemplary system that allows for avatar accessorizing using animated items.

In another aspect of the present disclosure, FIG. 3 illustrates an exemplary system that allows for avatar accessorizing using animated items. An avatar engine 302 may be configured to apply accessory items to avatars 308. The accessory items may contained in a animation package 318 and be provided together with three dimensional meshes 312, bit-mapped textures 314, configuration information (e.g. where the items should be placed in relation to the avatar 308). All this code and data could be part of an overall avatar accessory package 310. In short, the avatar engine 302 may access content in the avatar accessory package 310 and then apply this content to the actual avatar 308.

There may be various triggering mechanisms for applying such item content to avatars. For example, one such mechanism can include a user interface 306 that allows users to select which items to apply to which avatars. Alternatively (or in addition to), game titles 304 themselves can be a trigger for applying item content to avatars, depending on the implementation and user interaction with a gaming console hosting such an avatar engine 302. Yet, in other aspects of the present disclosure, the avatar engine 302 may reside on hosting server and any processing may be performed upstream from users.

FIG. 3 also shows that there may be various sources for the shown avatar accessory package 310. In addition to item content being provided by the game titles themselves 322, such content can be acquired from an online source 324 or it can be purchased from various sources (including games, servers, and other media). Thus, the avatar engine 302 can apply item content that was created by various content creators 326, as long as such creators are aware of standards expected by the avatar engine 302. However, universal (non-proprietary) standards may also be used, as those skilled in the art will readily appreciate.

Figure 4:
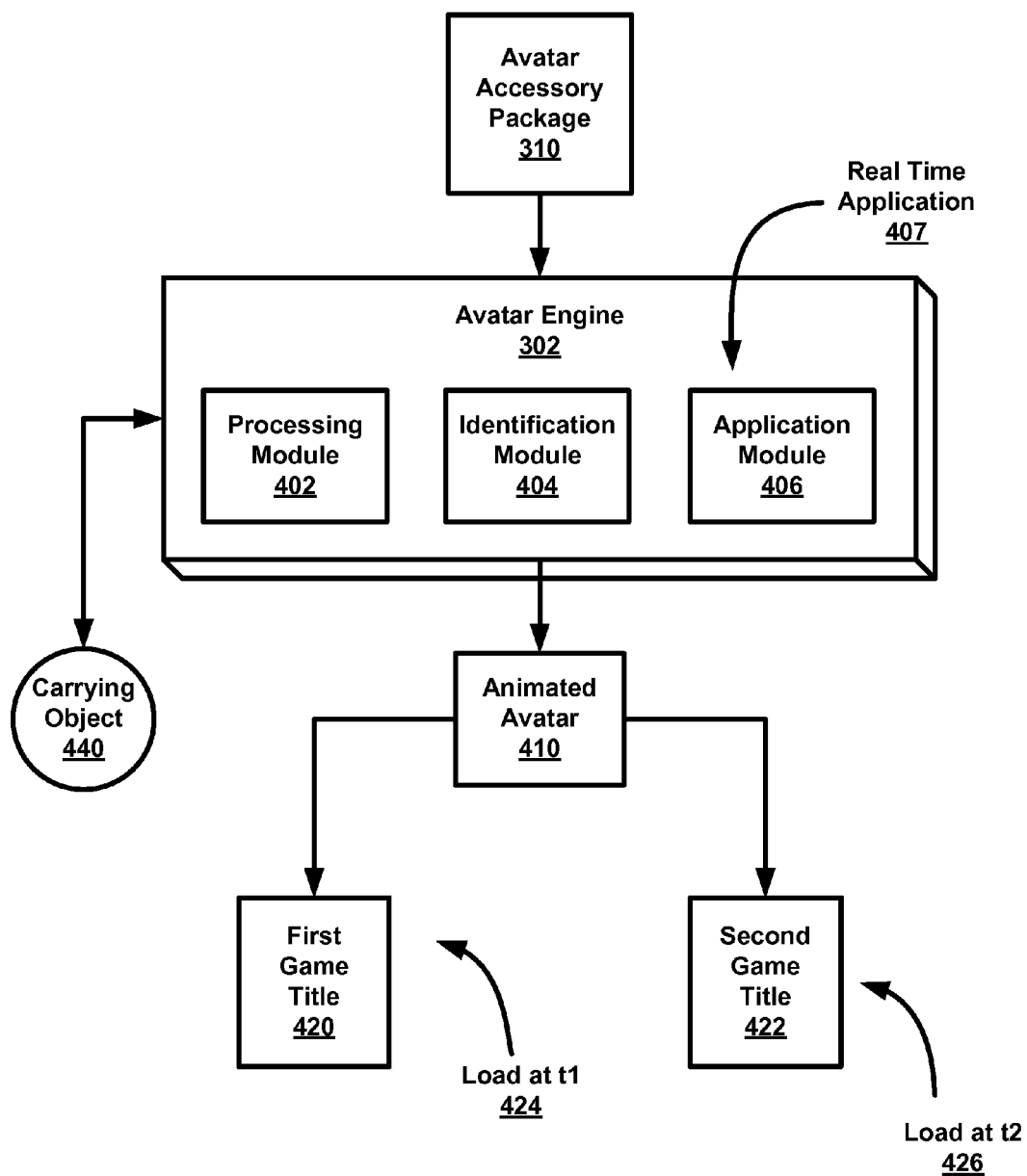
FIG. 4 illustrates a system for animating avatars across a plurality of games.

In another aspect of the presently disclosed subject matter, FIG. 4 illustrates a system for animating avatars across a plurality of games. Although a system is shown in FIG. 4, this subject matter can be practiced as a method and/or computer readable media (which is true of this figure with respect to any of the other figures, and vice versa). In FIG. 4, the above discussed avatar engine 302 may have various modules. The shown modules 402, 404, 406 are merely exemplary and non-limiting (as holds true for any of the present disclosure that is exemplary and non-limiting).

Thus, a system may be used for animating gaming console avatars in a plurality of different ways, where the system may be loaded in local computer memory and where it may be executed by a physical processor. In such a system, a processing module 402 may be configured to process an accessory package 310 containing a plurality of animation items. Another module, the identification module 404, may be configured to identify avatars and animation items from the plurality of animation items. And still another module, the application module 406, may be configured to apply the animation items to the avatars.

This system may accommodate various other aspects, such as having animation items applied to the avatars 410 at least in a first game title 420 and a second game title 422. Moreover, the animation items may be configured to be applied to the avatars 410 while the first game title 420 is playing 407. In other aspects, animation items may be further configured to be applied to the avatars 410 while the second game 422 title is playing 407. The first game title 420 and the second game title 422 may be distinct from each other in that they may be loaded separately, at time t1 424 and at time t2 426.

Figure 5:
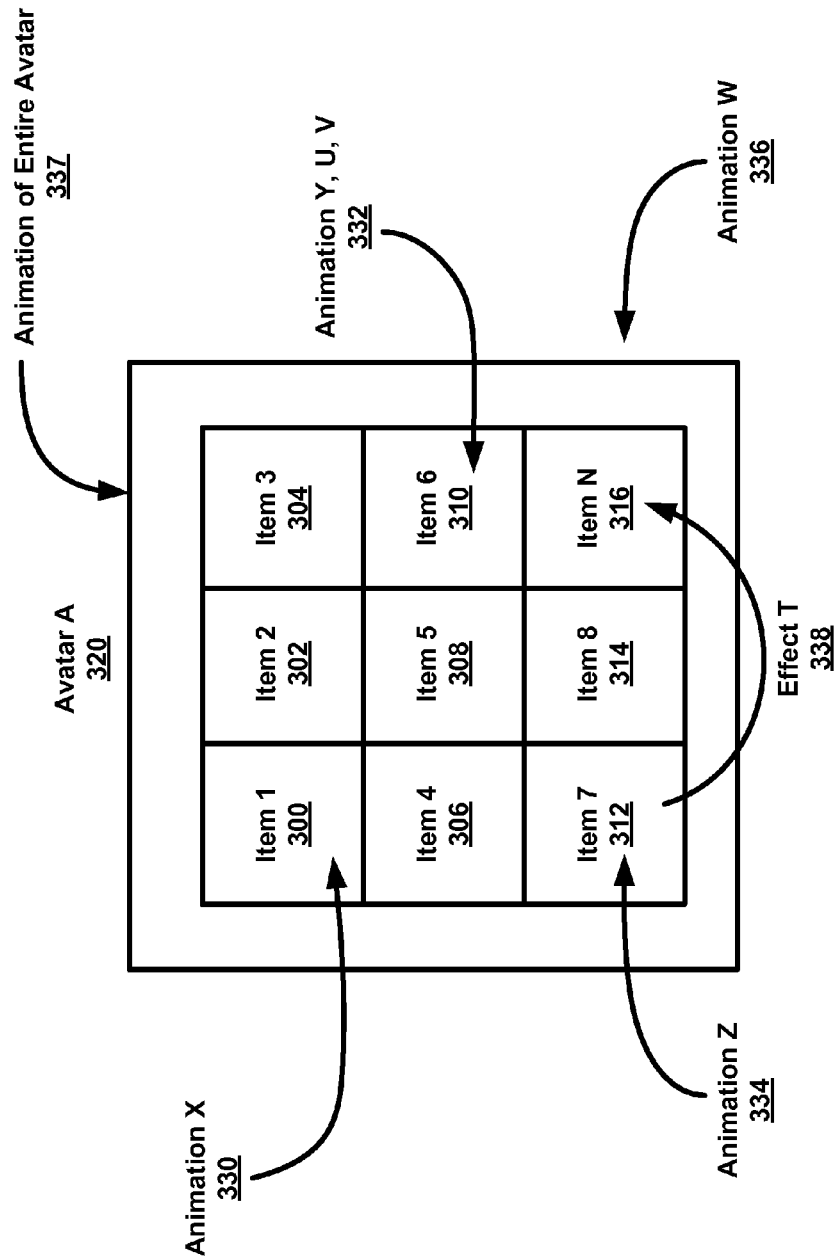
FIG. 5 illustrates various aspects of animating items as they are applied to avatars.

FIG. 5 illustrates various aspects of animating items as they are applied to avatars. A plurality of items are shown 300-316. For example, item 1 300 can be animated, as can item 7 312 and item 6 310 (having several different types of animations Y, U, V). In one aspect of the presently disclosed subject matter, one avatar can have a corresponding animation item (one-to-one relationship); however, the avatar-to-item relationship can be one-to-many and many-to-one. In any event, as was mentioned above, animation items can be confined to themselves, such as item 1 300, item 6 310 and item 7 312, or then can be applicable to the entire avatar 320, as was already mentioned above. In still other aspects, animation items can have causal relationships 338 with other items, such as one animation item on an avatar having a causal effect on another animation item.

Figure 6:
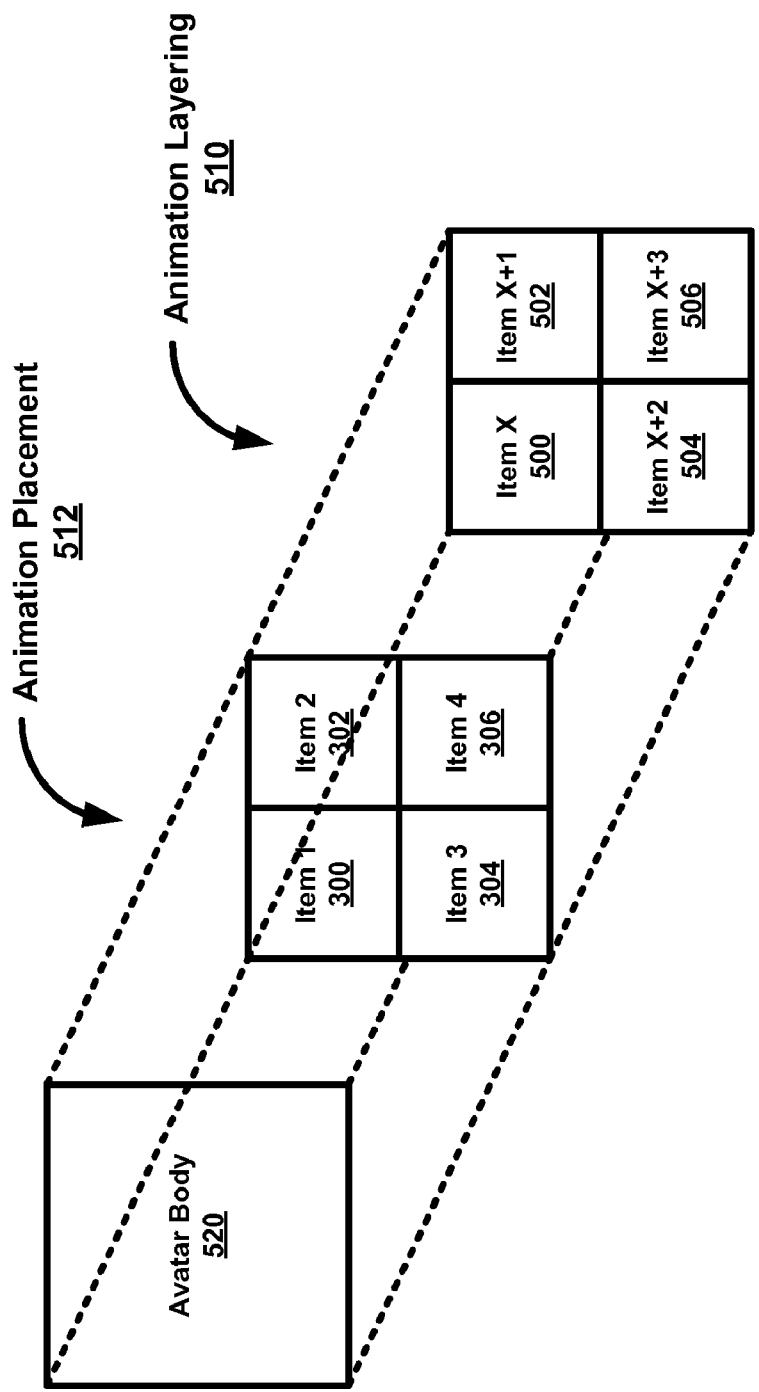
FIG. 6 illustrates superposition of animation items.

FIG. 6 illustrates superposition of animation items. For example an avatar body 520 can have applied to it any number of items 300, 302, 304, and 306. The animation placement 512 can be designated in the animation package discussed above. In one aspect of the present disclosure, other animation items 500, 502, 504, 506 can be layered on top 510 of the original animation items 300, 302, 304, and 306. For example, if the first items 512 are blue colored, and the second items 510 are yellow colored, the result will be green colored animation items. Thus, animation items may have various placements on avatar bodies that can overlap, reside along with, or cover other animation items.

Figure 7:
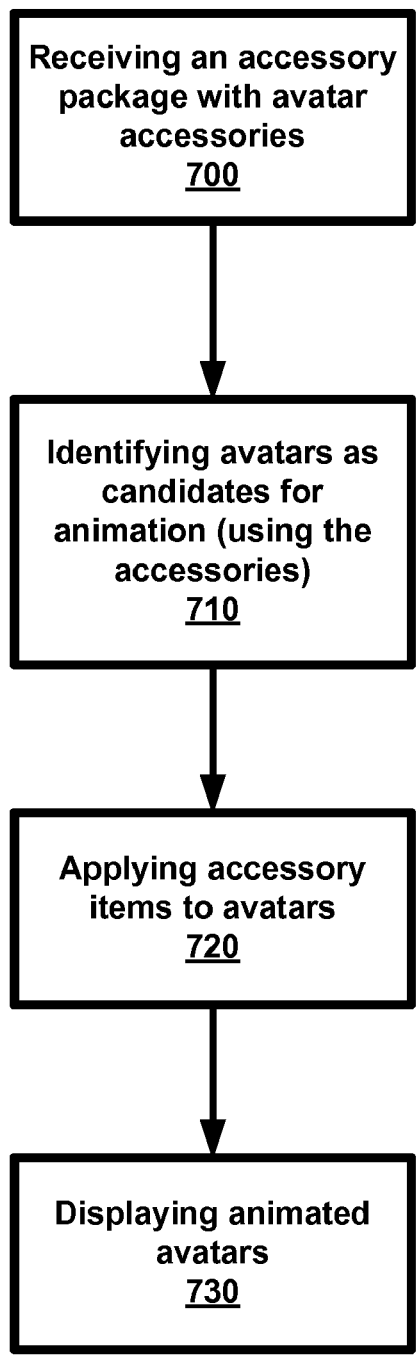
FIG. 7 illustrates an exemplary method for implementing the presently disclosed subject matter.

FIG. 7 illustrates an exemplary method where a step is performed comprising receiving an accessory package with avatar accessories 700. The next step may be identifying avatars as candidates for animation 710, and then applying accessory items to avatars. The final step may be actually displaying animated avatars 730. These steps can be used with the disclosure provided above, such as the avatar accessories may comprise of a plurality of items that are applicable to an avatar, the avatar may be an object corresponding to a user of a gaming console, and at least one of the plurality of items may be configured to be animated when applied to said avatar. Moreover, triggering events may be used, avatars may be applied at least across two distinct game titles (e.g. loaded separately), avatars may be accessorized in real time during game play, avatars may be continuously animated during a game (or they may pause as times), and so on.

Figure 8:
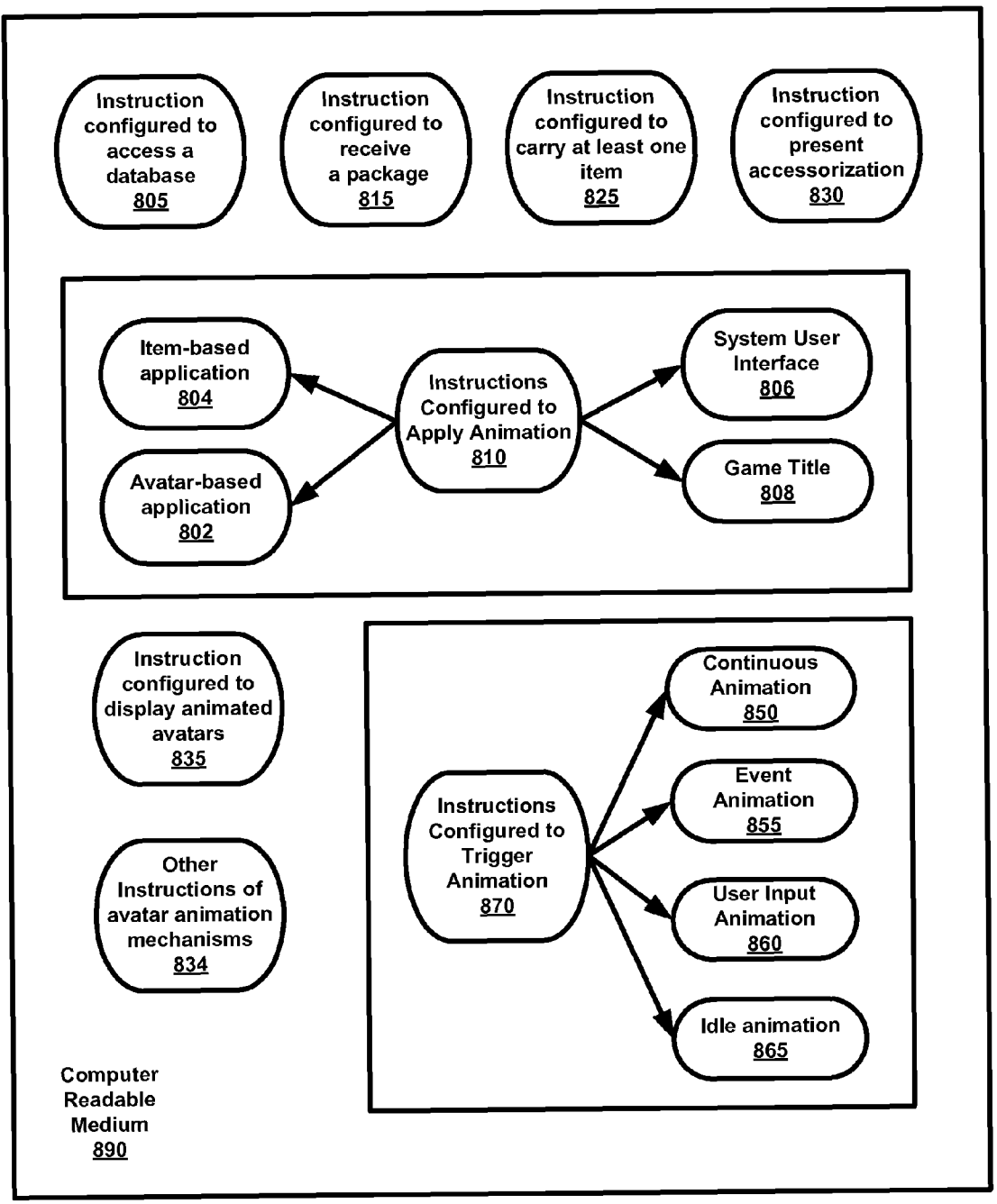
FIG. 8 illustrates an exemplary computer readable medium for implementing the presently disclosed subject matter.

FIG. 8 illustrates an exemplary computer readable medium 890 storing thereon various computer executable instructions. This medium 890 can be implemented as a system or practiced as a method, thus the present disclosure discussing computer readable media is merely exemplary. A plurality of instructions may be employed in order to accessorized avatars with items. Instructions for accessing 805 a database may allow for downloading of avatar accessorization content from remote databases; instructions for receiving 815 packages can process or unwrap any such accessorization content wrapped up in packages; instructions that apply 810 accessories to avatars may allow users to setup the look and feel of avatars in a desired manner; instructions that display animated avatars can be used to display this content on a variety of different media, such as monitors, cell phones, and so on.

It will be readily appreciated that other instructions may be used in conjunction with the aspects discussed above, such as: instructions configured to carry at least one item between or across different game titles 825; instructions configured to present to a user the option of accessorizing any avatars during the execution of games 830; instructions configured to trigger and manage animation in different ways 870, such continuous 850, event 855, user 860, and idle 865 animation; instructions configured to apply animation in specific ways 810, such as item-based 804 and avatar-based 802, or using different mechanisms, such as user interface 806 and game titles 808. It should be noted that other instructions 835 that embody the various aspect discussed above may be used.

Figure 9:
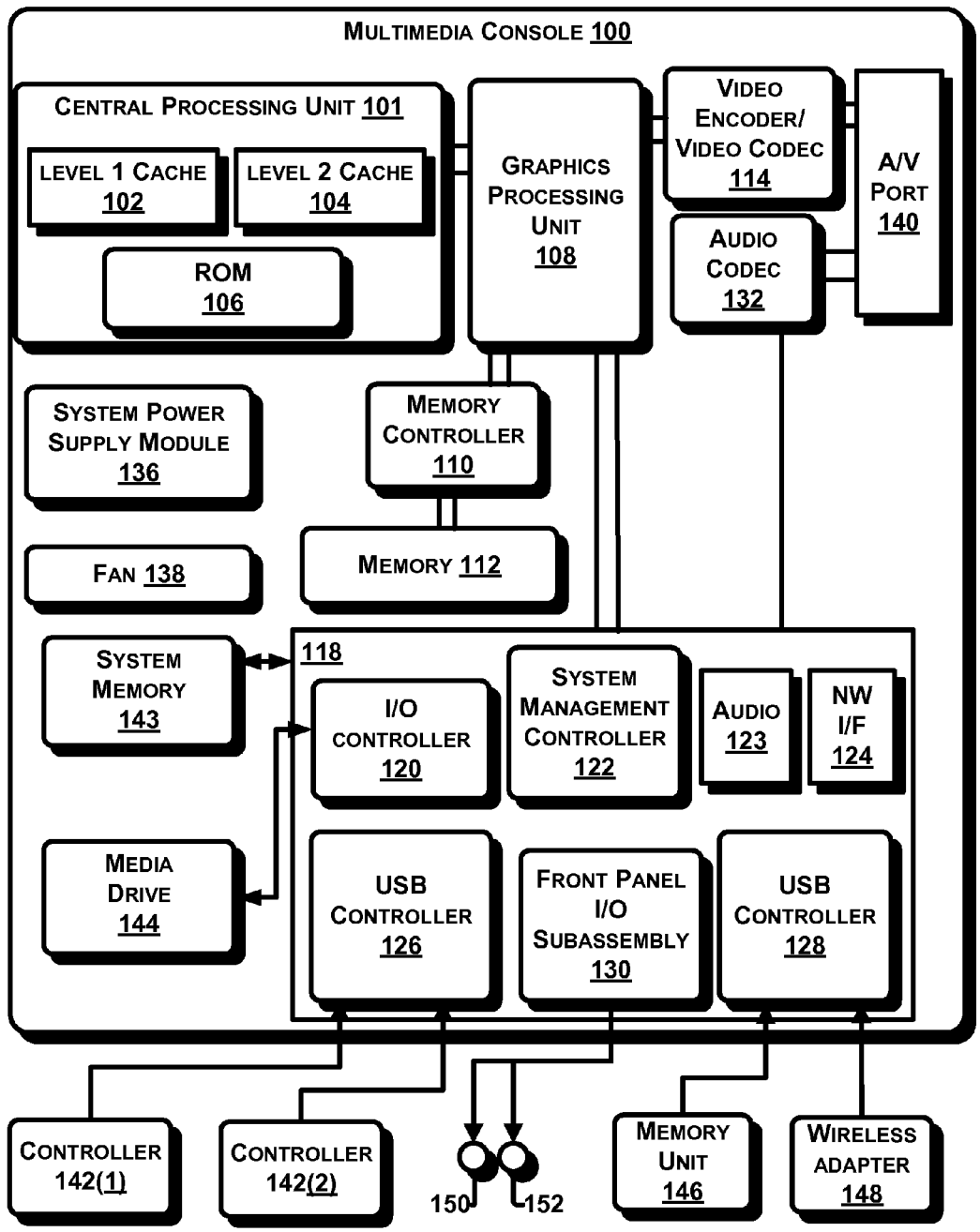
FIG. 9 illustrates an exemplary computing device, such as a console, that can be used in conjunction with the various aspects of the present disclosure discussed with reference to FIGS. 1-8 and 10.

The above discussed computing devices and accessories can be embodied as gaming consoles, music players, personal computers, controllers, remote control devices and other such devices having different, similar, or the same platforms. Referring to FIG. 9, a block diagram shows an exemplary multimedia console that can be used in conjunction with the various accessories with lighting activation by proximity and motion capabilities.

This console, which includes a game oriented console or a PC, can comprise, for example, digital audio processing functionality. Specifically, in FIG. 9, a multimedia console 100 is shown, with a central processing unit (CPU) 101 having a level 1 (L1) cache 102, a level 2 (L2) cache 104, and a flash ROM (Read-only Memory) 106. The level 1 cache 102 and level 2 cache 104 can temporarily store data and hence reduce the number of memory access cycles, thereby improving processing speed and throughput. The flash ROM 106 can store executable code that is loaded during an initial phase of a boot process when the multimedia console 100 is powered. Alternatively, the executable code that is loaded during the initial boot phase can be stored in a flash memory device (not shown). Further, ROM 106 can be located separately from the CPU 101. These memory devices can cache parts or the entirety of the above mentioned applications, programs, applets, managed code, and so on. Moreover, these memory devices can store sensitive and non-sensitive information on a memory unit-by-memory unit basis, as was discussed above. Any of such information can be used at least in part to aid in animating avatars as was discussed above.

A graphics processing unit (GPU) 108 and a video encoder/video codec (coder/decoder) 114 can form a video processing pipeline for high speed and high resolution graphics processing. Data can be carried from the graphics processing unit 108 to the video encoder/video codec 114 via a bus. The video processing pipeline can output data to an A/V (audio/video) port 140 for transmission to a television or other display. A memory controller 110 can be connected to the GPU 108 and CPU 101 to facilitate processor access to various types of memory 112, such as, but not limited to, a RAM (Random Access Memory). Thus, various types of information, whether sensitive or not, or even parts of various types of information, can be stored in the various types of memories discussed above, depending on the need.

The multimedia console 100 can include an I/O controller 120, a system management controller 122, an audio processing unit 123, a network interface controller 124, a first USB host controller 126, a second USB controller 128 and a front panel I/O subassembly 130 that can be preferably implemented on a module 118. The USB controllers 126 and 128 can serve as hosts for peripheral controllers 142(1)-142(2), a wireless adapter 148, and an external memory unit 146 (e.g., flash memory, external CD/DVD ROM drive, removable media, etc.). Such peripheral controllers 142(1)-142(2) can have various types of lighting displays that is triggered by proximity and motion. Moreover, the network interface 124 and/or wireless adapter 148 can provide access to a network (e.g., the Internet, home network, etc.) and can be any of a wide variety of various wired or wireless interface components including an Ethernet card, a modem, a Bluetooth module, a cable modem, and the like.

System memory 143 can be provided to store application data that is loaded during the boot process. A media drive 144 can be provided and can comprise a DVD/CD drive, hard drive, or other removable media drive, etc. The media drive 144 can be internal or external to the multimedia console 100. Application data can be accessed via the media drive 144 for execution, playback, etc. by the multimedia console 100. The media drive 144 can be connected to the I/O controller 120 via a bus, such as a Serial ATA bus or other high speed connection (e.g., IEEE 1394). Additional to such application data, other information can be stored on the console 100 that will aid in the communication between peripheral/accessory device controllers and the console 100 itself.

The system management controller 122 can provide a variety of service functions to assure the availability of the multimedia console 100. The audio processing unit 123 and an audio codec 132 can form a corresponding audio processing pipeline with high fidelity, 3D, surround, and stereo audio processing according to aspects of the presently disclosed subject matter above. Audio data can be carried between the audio processing unit 123 and the audio codec 126 via a communication link. The audio processing pipeline can output data to the A/V port 140 for reproduction by an external audio player or device having audio capabilities.

The front panel I/O subassembly 130 can support the functionality of the power button 150 and the eject button 152, as well as any LEDs (light emitting diodes) or other indicators exposed on the outer surface of the multimedia console 100. A system power supply module 136 can provide power to the components of the multimedia console 100. A fan 138 can cool the circuitry within the multimedia console 100.

The CPU 101, GPU 108, memory controller 110, and various other components within the multimedia console 100 can be interconnected via one or more buses, including serial and parallel buses, a memory bus, a peripheral bus, and a processor or local bus using any of a variety of bus architectures.

When the multimedia console 100 is powered on or rebooted, application data can be loaded from the system memory 143 into memory 112 and/or caches 102, 104 and executed on the CPU 101. Such application data can include some of the online derived data, including the avatar packages discussed above. The application can also present a graphical user interface that provides a consistent user experience when navigating to different media types available on the multimedia console 100. Users can accessorize avatars using such a user interface. In operation, applications and/or other media contained within the media drive 144 can be launched or played from the media drive 144 to provide additional functionalities to the multimedia console 100. And, such media, including game titles can be the basis for accessorizing avatars.

The multimedia console 100 can be operated as a standalone system by simply connecting the system to a television or other display. In this standalone mode, the multimedia console 100 can allow one or more users to interact with the system, watch movies, listen to music, and the like. However, with the integration of broadband connectivity made available through the network interface 124 or the wireless adapter 148, the multimedia console 100 can further be operated as a participant in a larger network community of computing devices. As such a participant, it can interact with computing devices, whether PCs or servers, and receive information that can be eventually stored.

Figure 10:
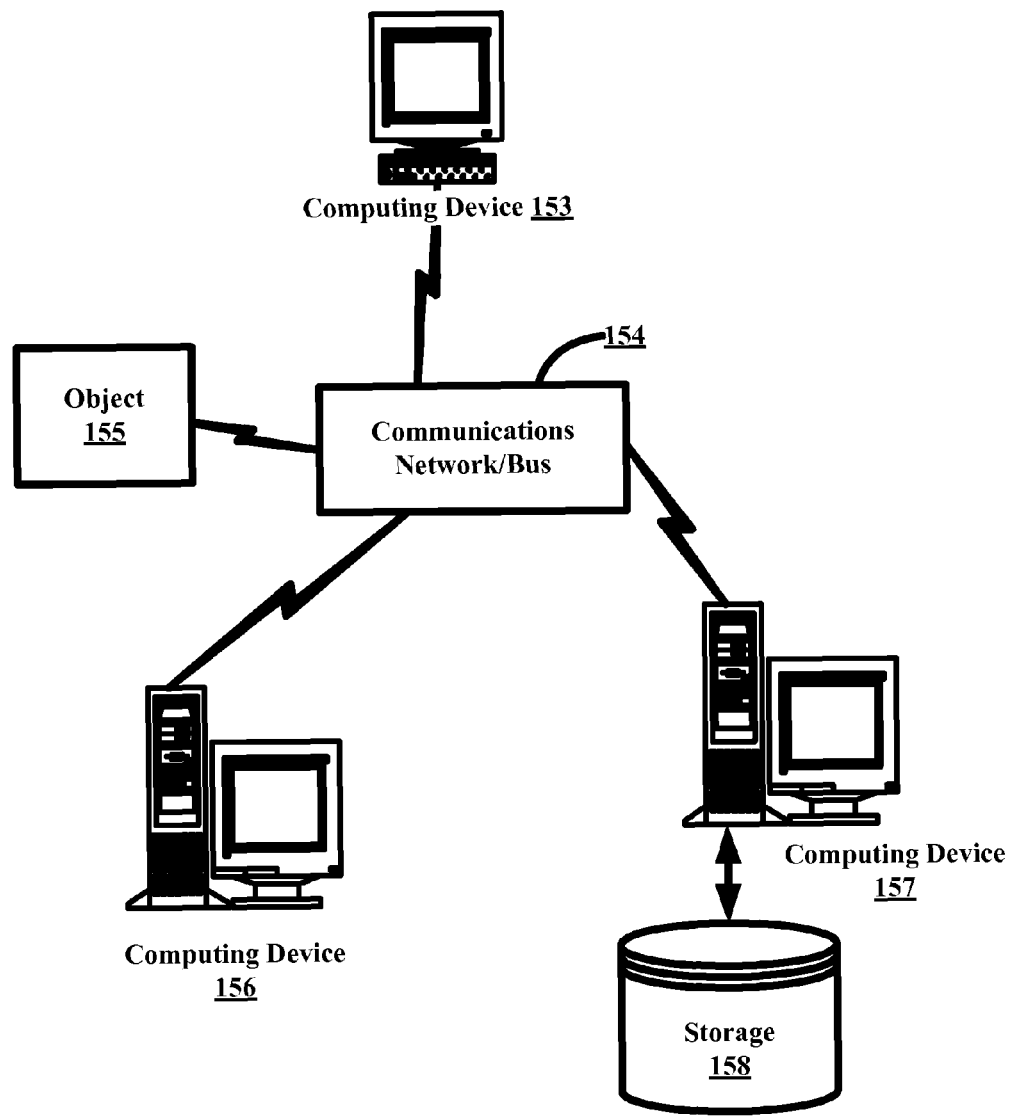
FIG. 10 illustrates an exemplary networking environment for the presently disclosed subject matter discussed with reference to FIGS. 1-9.

Next, FIG. 10 illustrates an exemplary networking environment for subject matter discussed with reference to FIGS. 1-9. The above discussed console 100 can correspond to any one of the aforementioned computing devices, or it can be distributed over such devices. It can interact with various other objects 155 and storage devices 158 via a communications network/bus 154, where such objects 155 and devices 158 can correspond to other computing devices (whether hardware, firmware, or software). The controllers 142(1)-142(2) can communicate with the console 100 in a wired manner or wirelessly, over close distances or over remote distances using the shown communications network 154. Such communication can be aided by various computing devices 156, 153, 157 connected to the communications network 154.

Finally, it should also be noted that the various techniques described herein can be implemented in connection with hardware or software or, where appropriate, with a combination of both. Thus, the methods and apparatus of the presently disclosed subject matter, or certain aspects or portions thereof, can take the form of program code (i.e., instructions) embodied in tangible storage media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device can generally include a processor, a storage medium readable by the processor (including volatile and non-volatile memory and/or storage elements), at least one input device, and at least one output device. One or more programs that can utilize the creation and/or implementation of domain-specific programming models aspects of the present invention, e.g., through the use of a data processing application programming interface (API) or the like, are preferably implemented in a high level procedural or object oriented programming language to communicate with a computer system. However, the program(s) can be implemented in assembly or machine language, if desired. In any case, the language can be a compiled or interpreted language, and combined.

Finally, while the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, in various aspects of the disclosure, methods, systems, and computer readable media were described configured for providing animation accessorization of avatars. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method for triggering, applying, and maintaining animation accessories for avatars in gaming console environments, comprising:
   receiving an accessory package with avatar accessories, wherein said avatar accessories comprise a plurality of items that are applicable to an avatar, at least two of the plurality of items having a relationship with one another;
   wherein said avatar is an object corresponding to a user of a gaming console;
   wherein at least one of said plurality of items is configured to be animated when applied to said avatar;
   identifying said avatar as a candidate for having said at least one of said plurality of items applied to said avatar;
   applying said at least one of said plurality of items to said avatar upon a triggering event;
   wherein said plurality of items are configured to be applied to said avatar at least across two distinct game titles;
   wherein said plurality of items are further configured to be applied during an execution of a game; and
   displaying said avatar that has been accessorized with said at least one of said plurality of items.

2. The method according to claim 1, wherein said at least one of said plurality of item contains animation specific to itself 3. The method according to claim 1, wherein said at least one of said plurality of item contains animation specific to an entire body of said avatar.

4. The method according to claim 1, wherein said triggering event is based on at least one of (a) a user input and (b) a game input, wherein a game executing on said gaming console is providing said game input.

5. The method according to claim 1, wherein said animated avatar is animated continuously as a user is playing said game.

6. The method according to claim 1, wherein at least an item of said plurality of items has a three-dimensional animation.

7. The method according to claim 1, wherein a first item of said at least two of said plurality of items is at least in part superimposed on a second item of said at least two of said plurality of items.

8. The method according to claim 1, wherein a first item of said at least two of said plurality of items at least in part has a causal effect on a second item of said at least two of said plurality of items.

9. The method according to claim 1, wherein said at least one of said plurality of items is a carrying object that is configured to be applied across said two distinct gaming titles.

10. A system for animating gaming console avatars in a plurality of differing ways, wherein said system is loaded in local computer memory and wherein said system is being executed by a physical processor, comprising:
   a processing module configured to process an accessory package containing a plurality of animation items, a first animation item of the plurality of animation items having a relationship with a second animation item of the plurality of animation items;
   an identification module configured to identify an avatar and an identified animation item from said plurality of animation items;
   an application module configured to apply said identified animation item to said avatar;
   wherein said identified animation item applies to said avatar at least in a first game title and a second game title; and
   wherein said identified animation item is configured to be applied to said avatar while said first game title is playing.

11. The system according to claim 10, wherein said identified animation item is further configured to be applied to said avatar while said second game title is playing.

12. The system according to claim 10, wherein said first game title and said second game title are distinct in being loaded separately.

13. The system according to claim 10, wherein said application module applies said identified animation item to said avatar upon a triggering event that is based on at least one of (a) a user input and (b) a game input.

14. The system according to claim 10, wherein said identified animation item is animated when a user is engaging a game.

15. The system according to claim 10, wherein said identified animation item is configured to be superimposed on an additional animation item applied to said avatar.

16. The system according to claim 10, wherein said application module is further configured to remove said identified animation item from said avatar upon a triggering event.

17. The system according to claim 10, wherein said plurality of animation items comprise at least one animation item that is animated in itself and at least one animation item that applies to an entire body of said avatar.

18. A computer readable medium, other than a signal, storing thereon computer executable instructions for accessorizing avatars with various animation items, comprising:
- an instruction for accessing a database comprising a plurality of accessory items residing on a remote server, a first accessory item of the plurality of accessory items having an effect on a second accessory item of the plurality of accessory items;
- an instruction for receiving a package of said plurality of accessory items at a local gaming console, wherein said package contains items that have animations specific to the items themselves, and wherein said package contains items that have animations that are applicable to entire avatars;
- an instruction that applies at least one item of said package of said plurality of accessory items to at least one avatar of said avatars;
- an instruction that carries said at least one item of said package of said plurality of accessory items from a first game title to a second game title;
- an instruction that presents to a user an option to accessorize any avatars associated with said user during execution of at least one of said first game title and said second game title; and
- an instruction that displays said at least one avatar that has been accessorized by said at least one item of said package.

19. The computer readable medium according to claim 18, further comprising:
- an instruction that provides at least one accessory item to said at least one avatar from a local source, wherein said local source is at least one of said first game title and said second game title.

20. The computer readable medium according to claim 19, further comprising:
- an instruction that interprets any three dimensional meshes, bitmap textures, and configuration information associated with said plurality of accessory items for application to said at least one avatar.

* * * * *

UNITED STATES PATENT AND TRADEMARK OFFICE
CERTIFICATE OF CORRECTION

Page 1 of 1

PATENT NO. : 8,384,719 B2
APPLICATION NO. : 12/184990
DATED : February 26, 2013
INVENTOR(S) : Brendan K. Reville et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this
Second Day of December, 2014

Michelle K. Lee
*Deputy Director of the United States Patent and Trademark Office*